(12) United States Patent
Solis

(10) Patent No.: US 12,142,904 B1
(45) Date of Patent: Nov. 12, 2024

(54) BOLT RECEIVING CLAMP ASSEMBLY

(71) Applicant: Danny Solis, Valencia, CA (US)

(72) Inventor: Danny Solis, Valencia, CA (US)

(*) Notice: Subject to any disclaimer, the term of this patent is extended or adjusted under 35 U.S.C. 154(b) by 0 days.

(21) Appl. No.: 18/426,584

(22) Filed: Jan. 30, 2024

(51) Int. Cl.
*H02G 3/14* (2006.01)
*F16B 5/06* (2006.01)

(52) U.S. Cl.
CPC .......... *H02G 3/14* (2013.01); *F16B 5/0621* (2013.01)

(58) Field of Classification Search
CPC ........... H02G 3/14; H02G 3/08; H02G 3/081; H02G 3/086; B65D 45/02; B65D 45/22; B65D 45/16; F16B 5/0621; F16B 5/0607; F16B 5/06
USPC ...... 220/328, 327, 326, 324, 325, 315, 4.02, 220/3.8, 3.94; 174/562, 561, 560, 559
See application file for complete search history.

(56) References Cited

U.S. PATENT DOCUMENTS

| | | | | | |
|---|---|---|---|---|---|
| 345,073 | A | * | 7/1886 | Phillips | B65D 45/02 220/248 |
| 3,490,637 | A | * | 1/1970 | Pope | E05B 65/006 220/325 |
| 4,091,232 | A | * | 5/1978 | Lenk | H05K 7/00 174/544 |
| 5,631,925 | A | * | 5/1997 | Koenzen | H04L 25/0262 375/225 |
| 7,607,553 | B2 | * | 10/2009 | Weber | H02G 3/086 174/562 |

* cited by examiner

*Primary Examiner* — Robert J Hicks
(74) *Attorney, Agent, or Firm* — James F. Kirk

(57) ABSTRACT

A bolt receiving clamp for use with a Traffic box having a claw plate with a first and second claw welded to a bottom tube for capturing a lowest edge of a corner of a traffic box. A top plate, welded to a top tube, the top plate gripping an inner flange of the box above the claws. The top tube is inserted in the bottom tube with an insert and bolt for adjusting the separation between the claws and the top plate. A strut channel nut plate sub-assembly is welded to the top plate. A safety bolt, for holding a cover on the box, passes through a channel in the top plate into the strut channel nut plate sub-assembly, to engage and thread into a strut channel safety nut, that is spring loaded and slides on rails to capture the safety bolt.

16 Claims, 19 Drawing Sheets

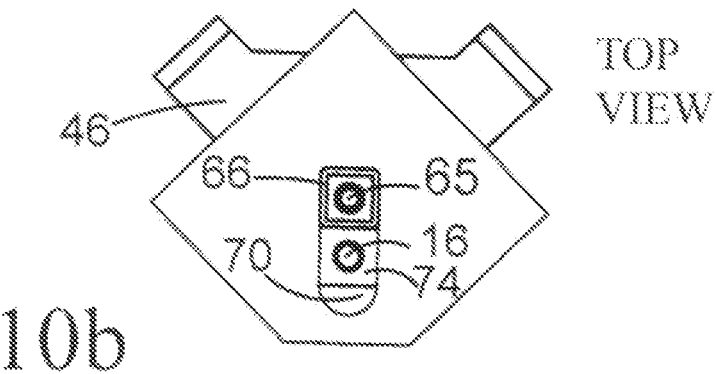
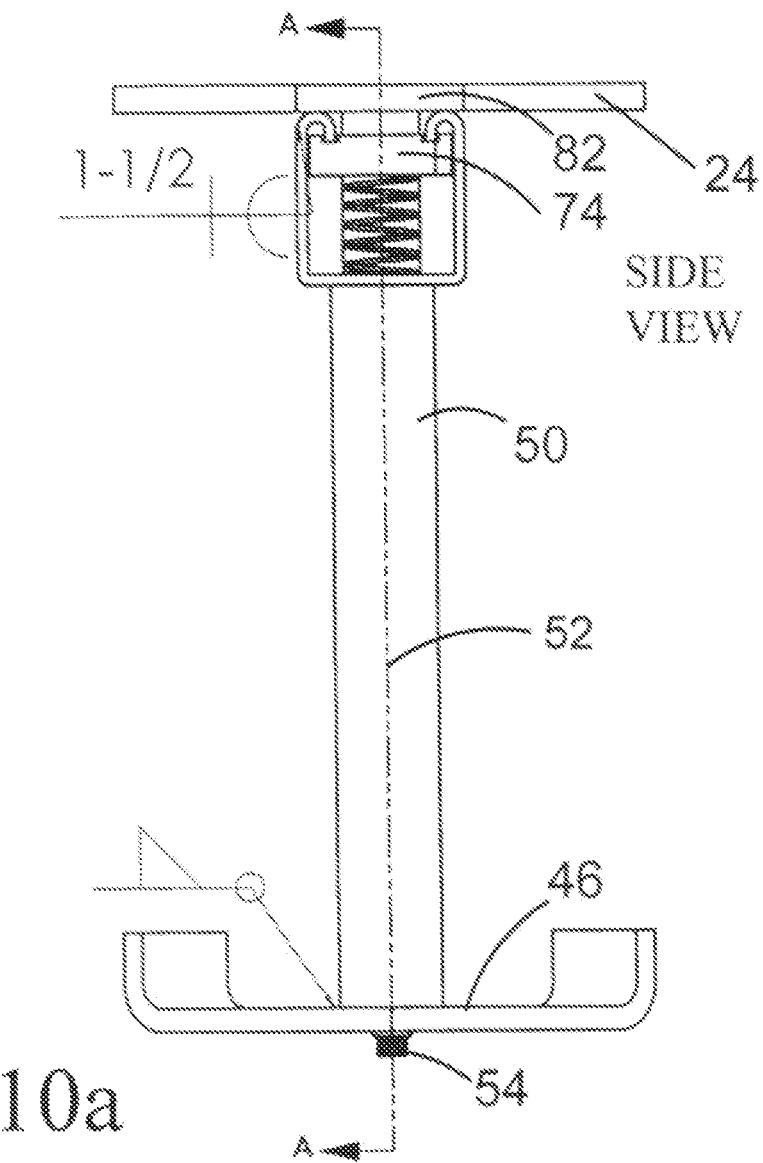

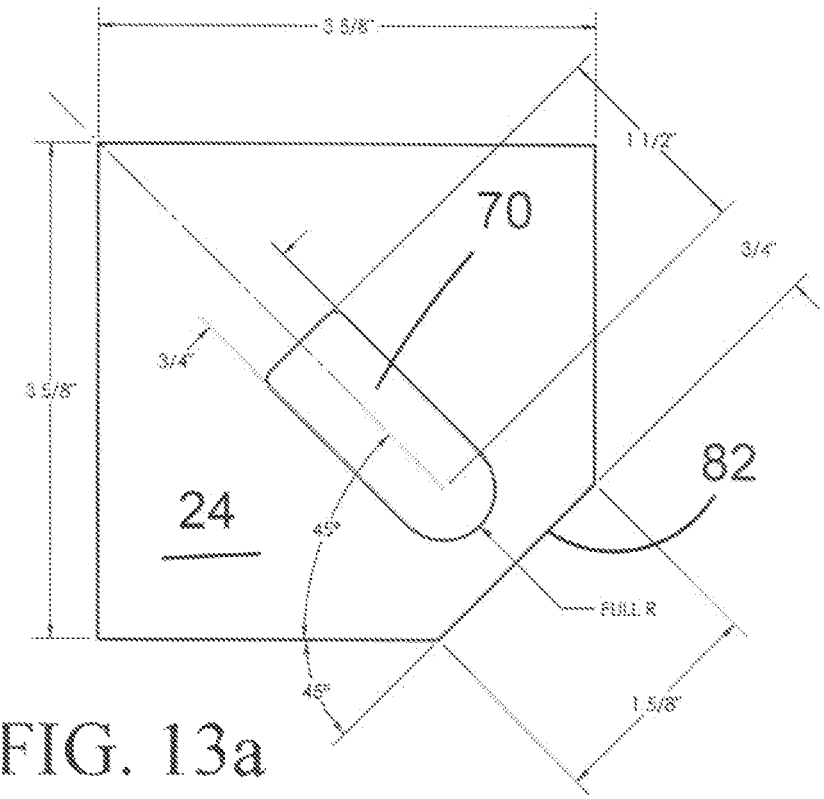
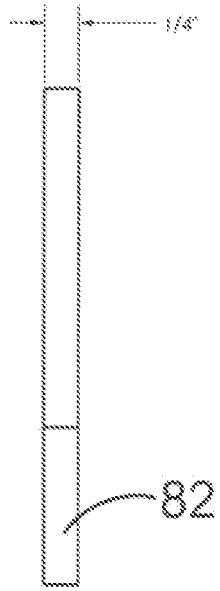
FIG. 13a  FIG. 13b
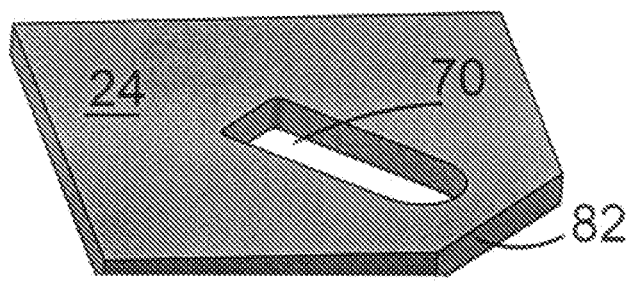
TOP PLATE
FIG. 13c

STANDOFF PLUG

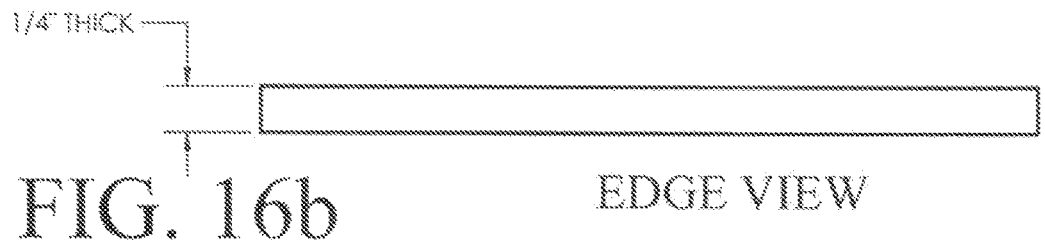
FIG. 16b  EDGE VIEW
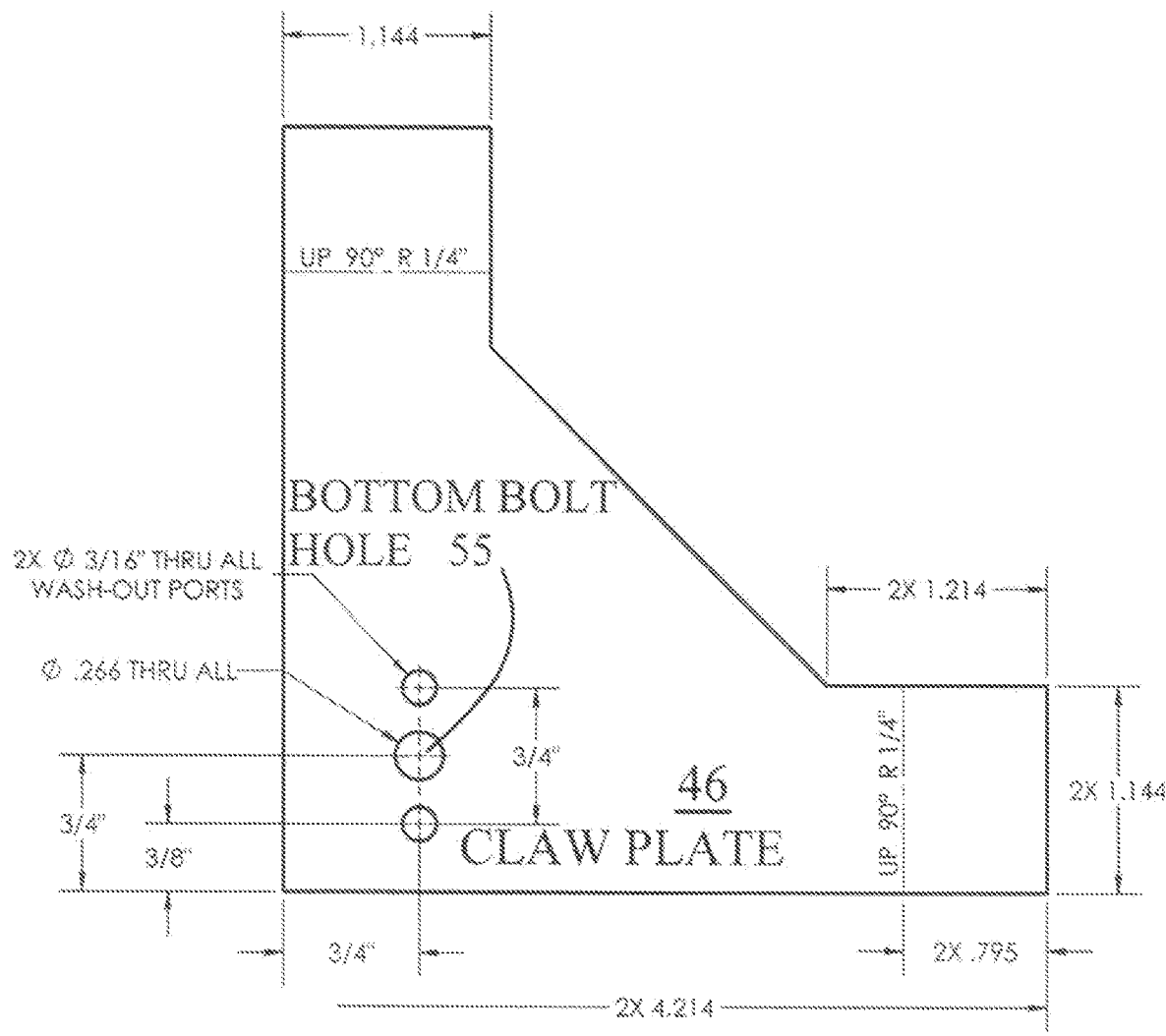
FIG. 16a  FLAT PATTERN VIEW

SAFETY BOLT CAP
REMOVAL TOOL

BOLT RECEIVING CLAMP ASSEMBLY

FIELD OF THE INVENTION

Traffic communications and electrical power delivery is getting more sophisticated. As traffic data and electricity travels through an underground conduit system to each traffic intersection or signal node. Underground traffic utility boxes that surround an intersection support traffic signal wires and data cables that are used to detect vehicle movement. In addition, vehicle detection loops are embedded in the nearby roads to provide signal information along with signals from signal lights on traffic utility poles via underground traffic utility boxes to signal destinations for traffic reporting. In recent past pedestrians will activate a push button to cross a pedestrian crosswalk and the signal wires for that purpose will pass to or through an underground traffic utility box in completing the necessary circuit.

Traffic data travels through underground conduit systems and at intersection or between major traffic communication hubs through concrete tubes or through fiber glass pull-through underground tubes to underground traffic a utility boxes each box having its own removable cover plate. Each underground utility box serves as nodes for connections and in some cases as the start for further distribution. The concrete or fiber glass and concrete pull-through boxes that are used in present day construction are typically buried along the side of a road or street at interval distances of tens or hundreds of meters from each other or from a using node. Utilities provide trenches between the boxes or other means that allow electrical power or communications lines to pass between successions of boxes.

BACKGROUND OF THE INVENTION

The lock boxes systems that are taught and claimed herein will serve to provide receiving and distribution locations to buildings that are commercial or residential locations. The underground traffic utility boxes can be joined by piping such as PVC tubing or other material though which the electrical lines are passed. As equipment is modified or repaired, lines that are new or original can then be added between boxes by pulling lines through a tube or pipe without new trenching being required.

As the price of copper has increased, there has been an increase in the number of underground traffic utility boxes that have been broken into with removal and theft of the wire within and to the boxes for the value of the copper in the wire.

The cost of replacing the wire and repairing the equipment illegally removed far exceeds the value of the wire that is stolen; however, there is no way for cities or utility companies to protect these very numerous and remote installations.

The concrete lock boxes used for distribution locations must be accessible for maintenance personnel responsible for maintenance and modification involving the addition of new service features. The boxes are not permanently sealed due to the need for maintenance and modifications. Removal of the cover plate used to cover the lock box must be limited to authorized personnel and the unauthorized removal.

Unauthorized removal of the cover plate must be made. so costly as to discourage those who might be tempted to break into a distribution box as to find other illegal work much more profitable.

Concrete and polymer underground traffic utility boxes with matching covers suitable for underground installation are available commercially for purchase with covers having preformed holes at opposing corners sized to receive a inch bolts. The boxes are formed to provide an inner rim or flange for receiving the bolts.

The advertising for such lock box with cover combinations do not show how the underground lock box having a cover with a preformed inner ledge fitted with a pair of preformed coaxial through holes passing through the cover and the ledge can be secured with a one inch bolt against an attack by a thief that is swinging a sledge hammer with his intent to fracture the concrete cover and the case with a cast ledge.

There could typically be as many as sixteen to twenty-two traffic boxes to support a given traffic signalized intersection. The size of the intersection and volume of vehicles that might travel through a given signalized intersection, determine the number of traffic or utility boxes that are employed at an intersection. In the past forty years of traffic construction practices, a typical underground traffic utility box in a metropolitan area has been a concrete traffic box with a removable concrete cover with no means of securing the removable concrete cover.

As new construction methods have evolved, newer boxes that are lockable are being installed. However, a 2016 report has shown that in one of the largest cities in California there are roughly 4,647 signalized intersections with utility boxes that may have cover plates that are not bolted on to the box. At present, there is no known low-cost method of upgrading older style utility boxes with a bolt on cover plate that will improve the security of the traffic box.

Further exacerbating the need to increase the speed of securing the utility boxes that are in service is the upcoming and new technologies of autonomous vehicles (peer to-peer vehicle communication) and intelligent intersections where future vehicle communicate with smart intersections. There is a need to secure older traffic concrete utility boxes that are in service and maintain vehicle and pedestrian safety and reliability for commerce trucking that travel through cities for business. The claimed traffic box system taught in this application will also focus on the existing concrete traffic boxes that have not been replaced and show how this underground security box system can repair an older system and convert the older model or make a new box secure to a point that a thief will see no profit in vandalizing an underground utility box modified in accordance with the parts, process and method provided in this application.

SUMMARY OF THE INVENTION

It is a first object of the invention to provide a bolt receiving clamp for use with a traffic box, sometimes referred to commercially an Armor Guard Lockable Traffic Box for securing the cover plate at the entrance of an underground electrical box where the box is of an old design as shown in FIG. 18, or a box of a newer design that has no embedded nut plate but is formed to have a flange in the box that supports the cover. The box must have an open bottom.

It is a second object of the invention to provide a means of repairing a box that has been damaged by vandals but that continues to provide a supporting inner flange for the support of a cover and that has at least two remaining undamaged bottom corners with the box having an open bottom.

The Traffic Box that employs a bolt receiving clamp has flange inside the box under the top rim of the box. The flange or cup forms a support in the shape of a cup on which the cover is supported.

The installation of the cover is supported by the installation of a pair of bolts receiving clamps in the box without the embedded nuts in the corners or walls of the box.

Each of the security clamps contains an upper integral strut channel nut plate subassembly that contains a security nut.

The strut channel nut plate subassembly is welded to an upper tube and to a top plate.

The lower portion is another welded integral assembly that has a pair of claws at its lower end and a bottom tube.

The claw assembly at the bottom and the floating nut assemblies at the top are coupled to opposing ends of the pair of telescoping tubes that are adjustable in length to link the strut channel nut plate subassembly directly to the bottom edge of the box via the claw and pair of telescoping tubes.

Each respective floating nut subassembly is characterized to receive a security bolt that passes through the cover and is threaded into the security nut in the strut channel nut plate subassembly. The bolt pulls the cover down until the downward force applied to the cover by the bolt, is matched by an equivalent upward force applied to the lip of the cover by surface of the cup formed as an inner flange around the inner wall near the top of the box.

During installation, the bolt receiving clamps are positioned at opposing corners of a concrete traffic box. The Final adjustment of the position of the security clamp assembly is aided by the use of a metal registration guide that enables an installer to guide the installed position of the security clamp during its installation, to a predetermined position at which the through holes in a cover plate are axially aligned with the security clamp floating nuts when the cover plate is dropped into position on the underground box.

When positioned, and before the installation of a security bolt through the cover plate, the location of the security clamp is fixed by tightening a special 12-point bolt that draws a top plate on the security clamp closer to its claw under the bottom edge of the open bottom box. As the height of the security is shortened, it forces a top plate of the security clamp down on the inner flange. The top plate is welded to the strut channel nut plate subassembly which contains and positions the vertical position of the floating nut.

Each security clamp provides two claws that engage or capture the lower edge of two walls of the utility box at two opposing corners of the box. Each pair of walls at a corner meets at right angles. At the conclusion of tightening the 12 point bolts, the cover plate positions the security clamp. With a pair of bolts receiving clamps guided into position with the aid of a sheet steel registration template, and locked with the 12 point bolts, the security bolts are passed through the previously registered through holes in the cover plate, and rotated to engage the floating nut in the respective strut channel nut sub-assembly that is part of the security clamp assembly. The security bolt is then tightened. Each security bolt has a design feature that prevent removal of the installed security bolt without the use of special tools that are only supplied to authorized users. After the security bolt is installed, a security cap is installed above the bolt head. The cap is made with a smooth surface formed as a concave shape that is matched by an installation and removal tool that has a convex shape characterized to engage the surface of the security cap as a method of providing added security for the traffic box.

A BRIEF DESCRIPTION OF THE DRAWINGS

FIG. 1 is a schematic exploded perspective view of bolt receiving clamp for use with a traffic box and a cover with two the bolt receiving clamps installed at opposing corners, FIG. 2 is a schematic sectional view taken on FIG. 1 that shows the placement of two bolt receiving clamps with two claws gripping the bottom edge of the traffic box, FIG. 3 is a schematic perspective view of the cover plate with a part shown above the plate including a safety bolt, a safety bolt install/removal tool, a safety bolt cap, and a cap installation/removal tool all shown in sequence'

Figure 8:
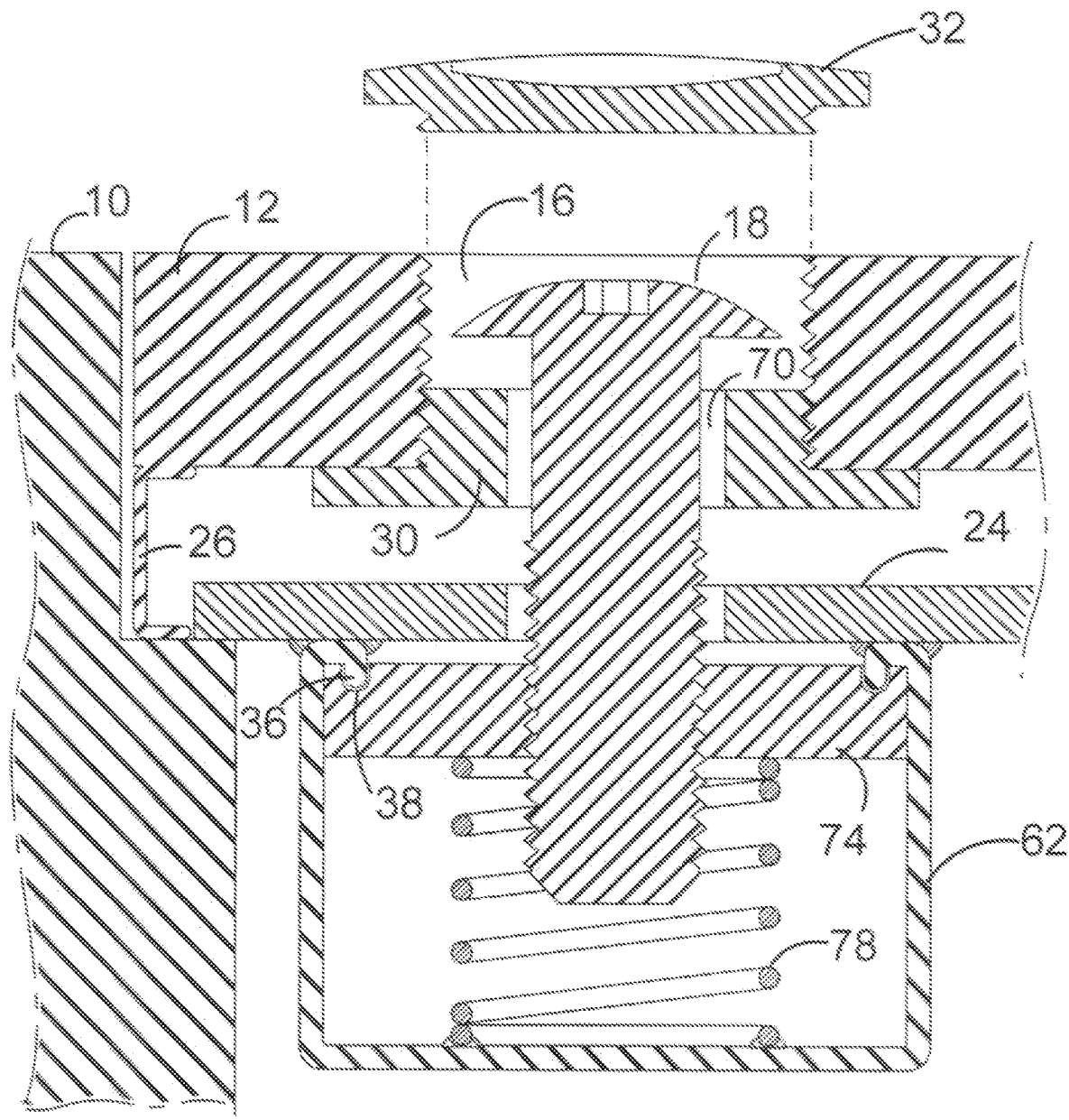
Figure 9:
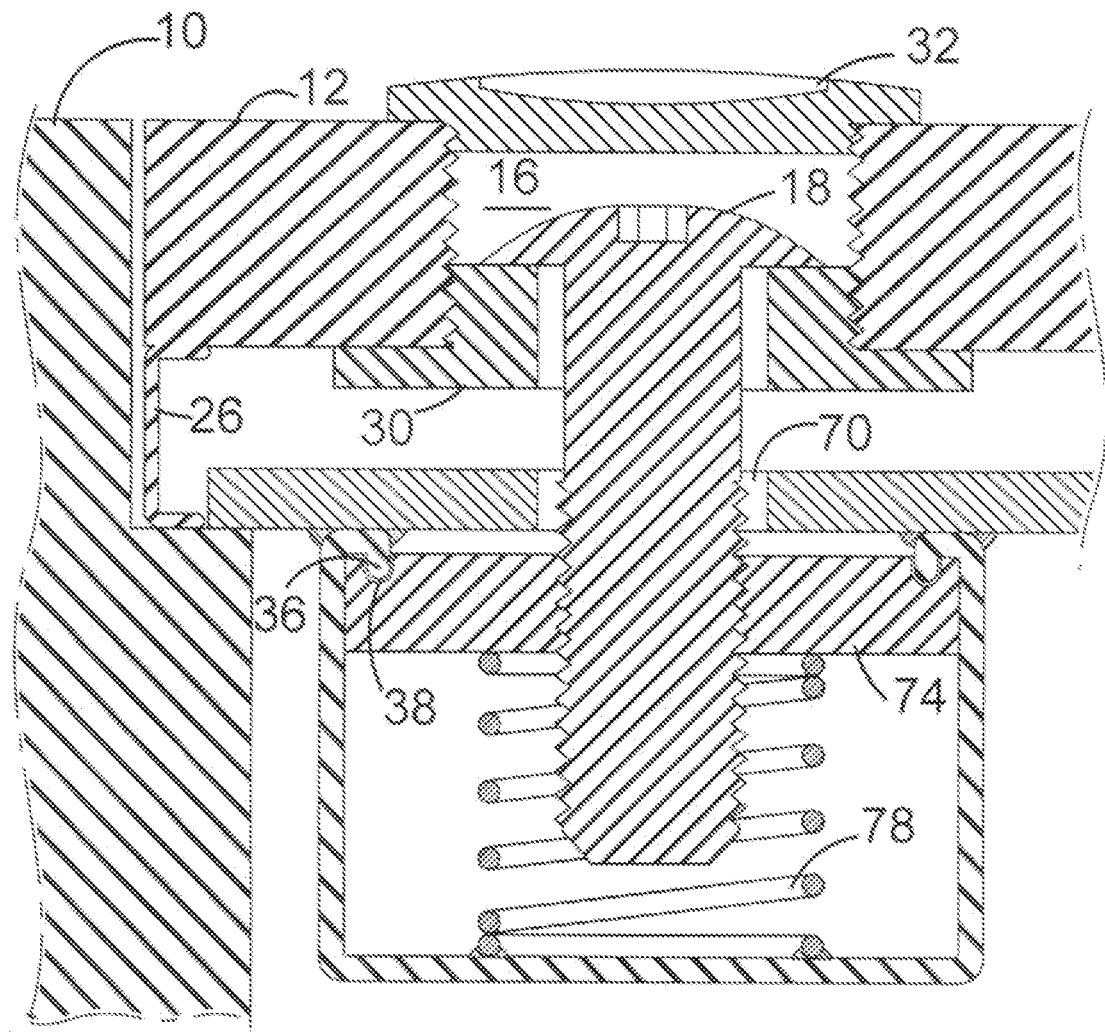
Figure 11:
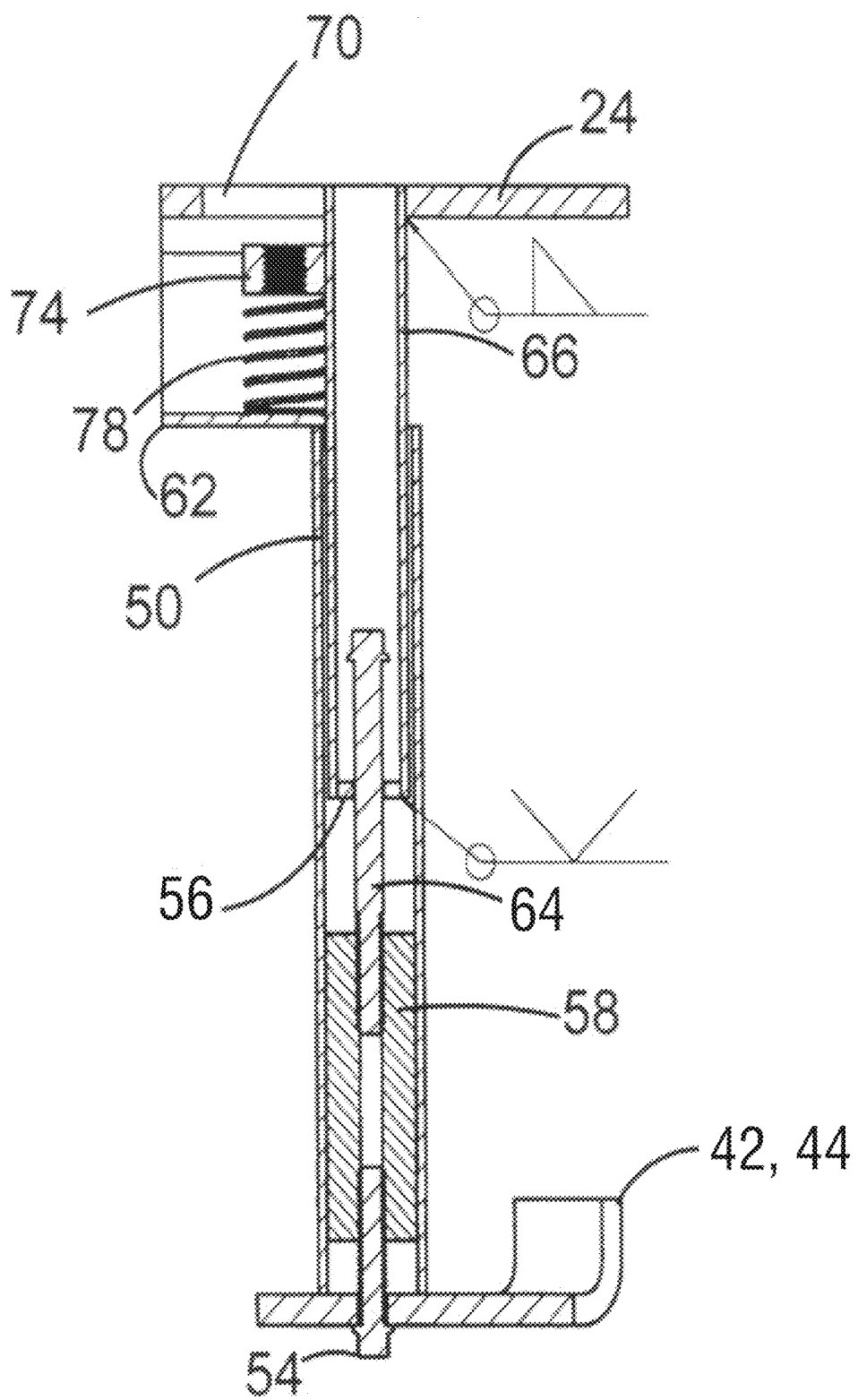
Figure 12B:
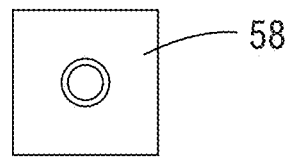
Figure 12A:
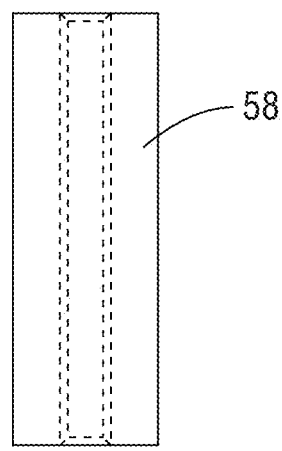

FIG. 8 is a schematic sectional view of the bolt receiving clamp before tightening in the strut channel nut plate subassembly, FIG. 9 is a schematic sectional view of the bolt receiving clamp after tightening in the strut channel nut plate subassembly of FIG. 8, FIG. 10a is a side view of a bolt receiving clamp, FIG. 10b is top view of the bolt receiving clamp, FIG. 11 is a side sectional view of the bolt receiving clamp of FIG. 10 taken on the section line A-A of FIG. 10a, FIG. 12a is a side view of the standoff, FIG. 12b is a top view of the standoff, FIG. 13a is a plan view of the top plate.

Figure 14A:
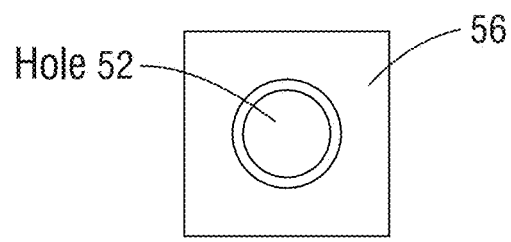
Figure 14B:
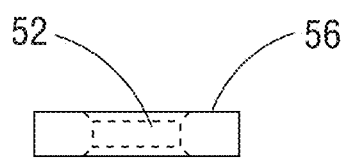
Figure 15A:
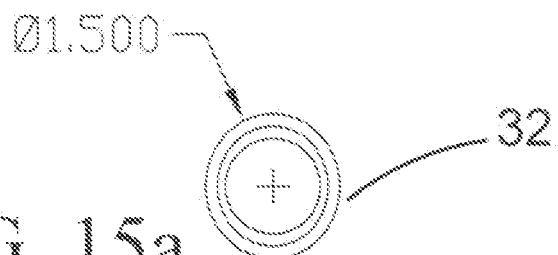
Figure 15B:
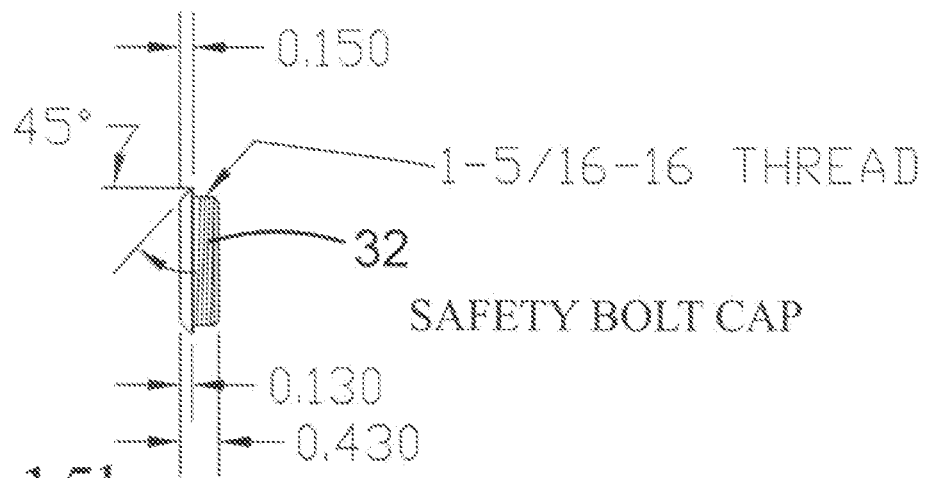
Figure 15C:
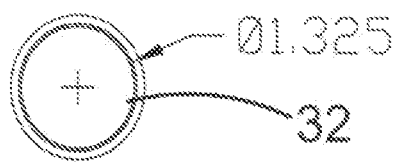
Figure 16C:
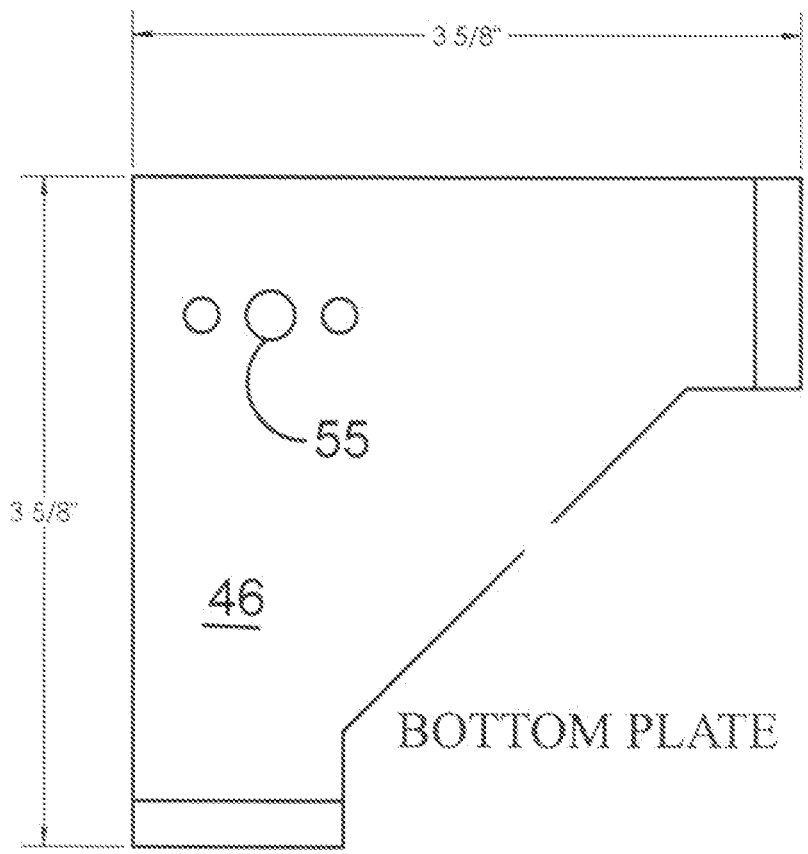
Figure 16D:
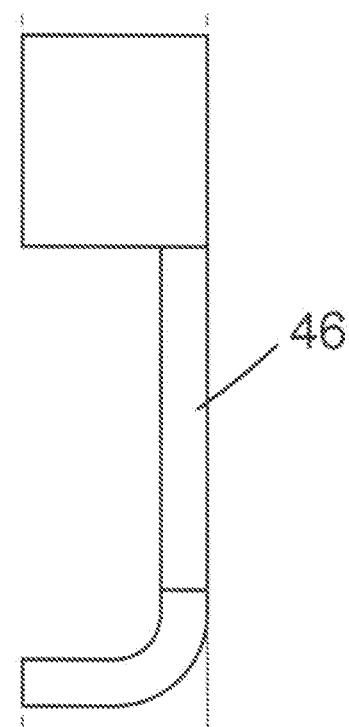
Figure 17A:
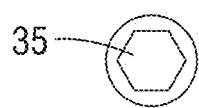
Figure 17B:
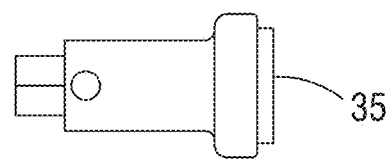
Figure 17C:
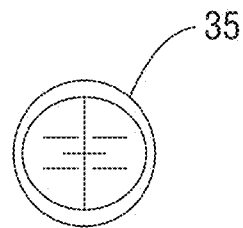
Figure 18:
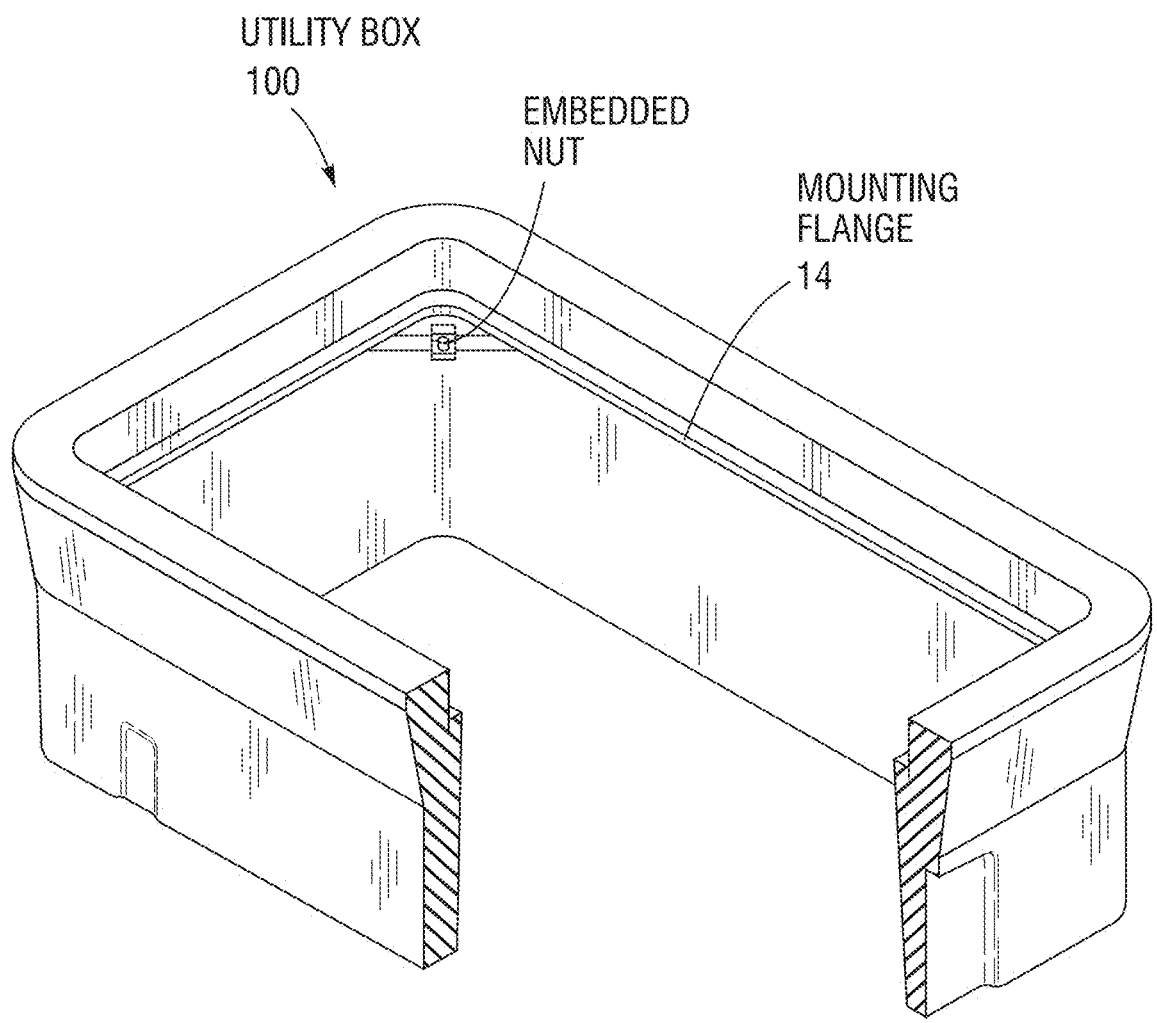

FIG. 13b is a side (or edge) view of the top plate,

FIG. 13c is a perspective view of the top plate in grey scale,

FIG. 14a is a plan view of the plug for the bottom of the top telescoping tube,

FIG. 14b is a side view of the plug for the bottom of the top telescoping tube,

FIG. 15a is a top plan view showing a concave safety bolt security cap,

FIG. 15b is a side view of the concave safety bolt security cap FIG. 15a,

FIG. 15c is a bottom plan view of concave safety bolt security cap 15a,

FIG. 16a is a plan view of the bottom plate flat pattern showing bend lines,

FIG. 16b is a side (or edge) view of the bottom plate flat pattern of FIG. 16a,

FIG. 16c is a plan view of the bottom plate after being bent showing the top surface (or edges) of two bent claws, FIG. 16d is a side view of the bottom plate after being bent showing the top surface (or edges) of two bent claws, FIG. 17a is the cap removal tool hex end, FIG. 17b is the side view of a cap removal tool, FIG. 17c is the convex end view of a cap removal tool, FIG. 18 is schematic perspective grayscale view of a prior art lockable security box with embedded nuts recessed in the corners.

DETAILED DESCRIPTION

This is a description is of a bolt receiving clamp for use with a traffic box. The traffic box in which the clamp is used can be a new and improved traffic box or with a vandalized traffic box that has been partially damaged. The traffic box in which the bolt receiving clamp is used is either a new traffic box as a replacement traffic box for underground electrical, conduit, and traffic signal equipment boxes such as or in where possible to repair a damaged older style utility box such as the older style utility box shown in FIG. 18

Figure 1:
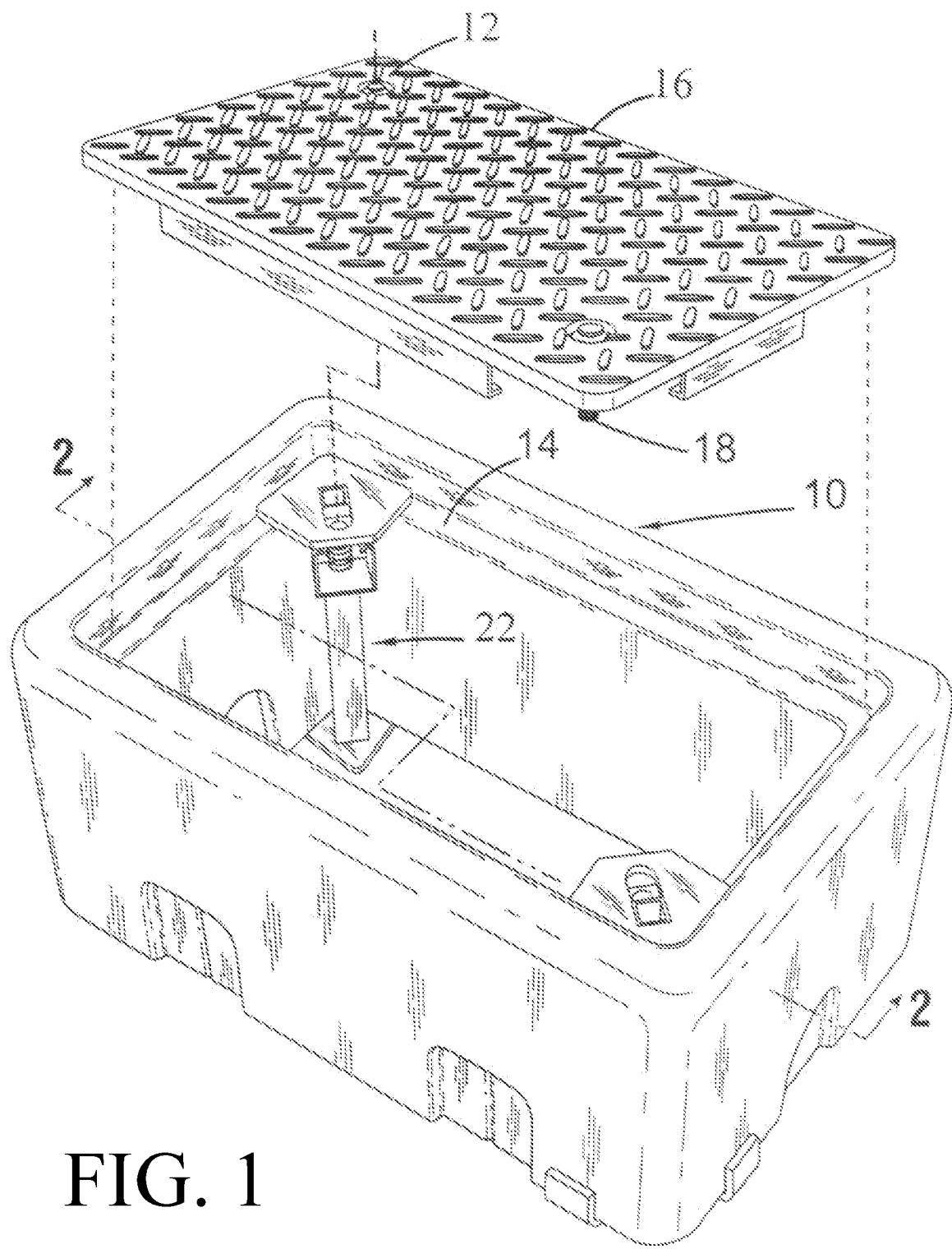
Figure 2:
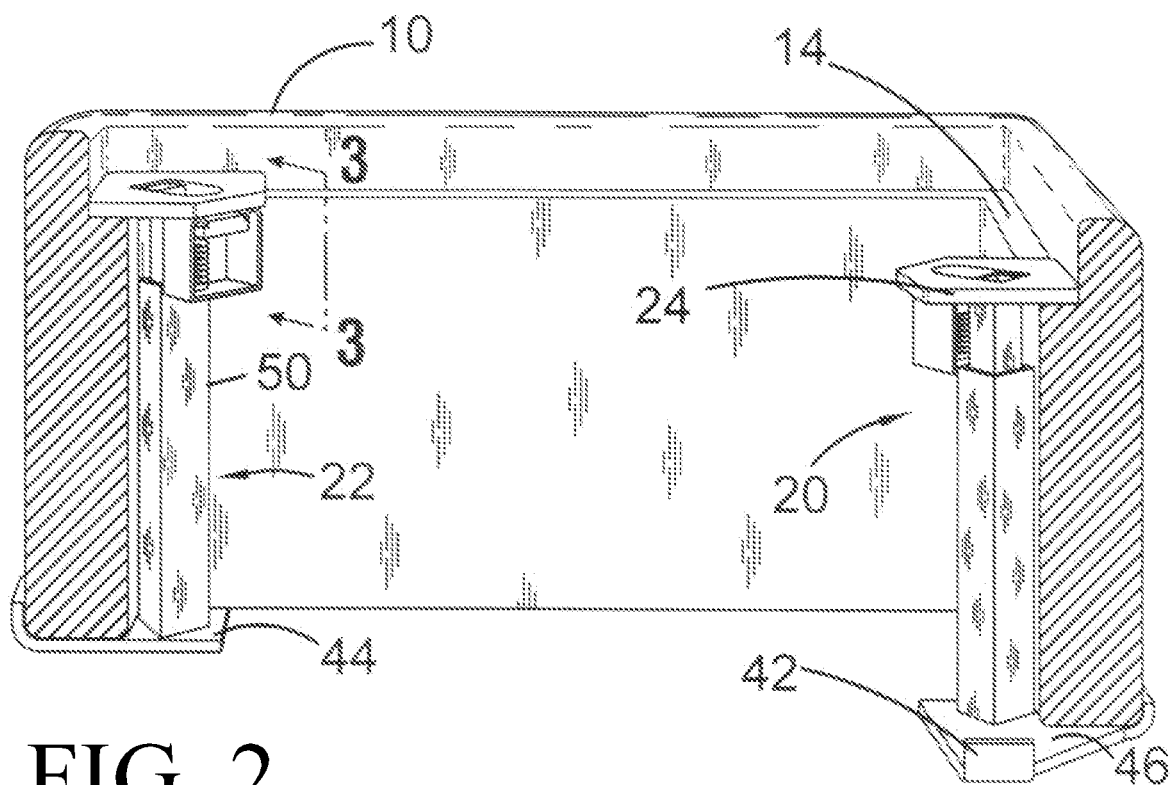
Figure 6:
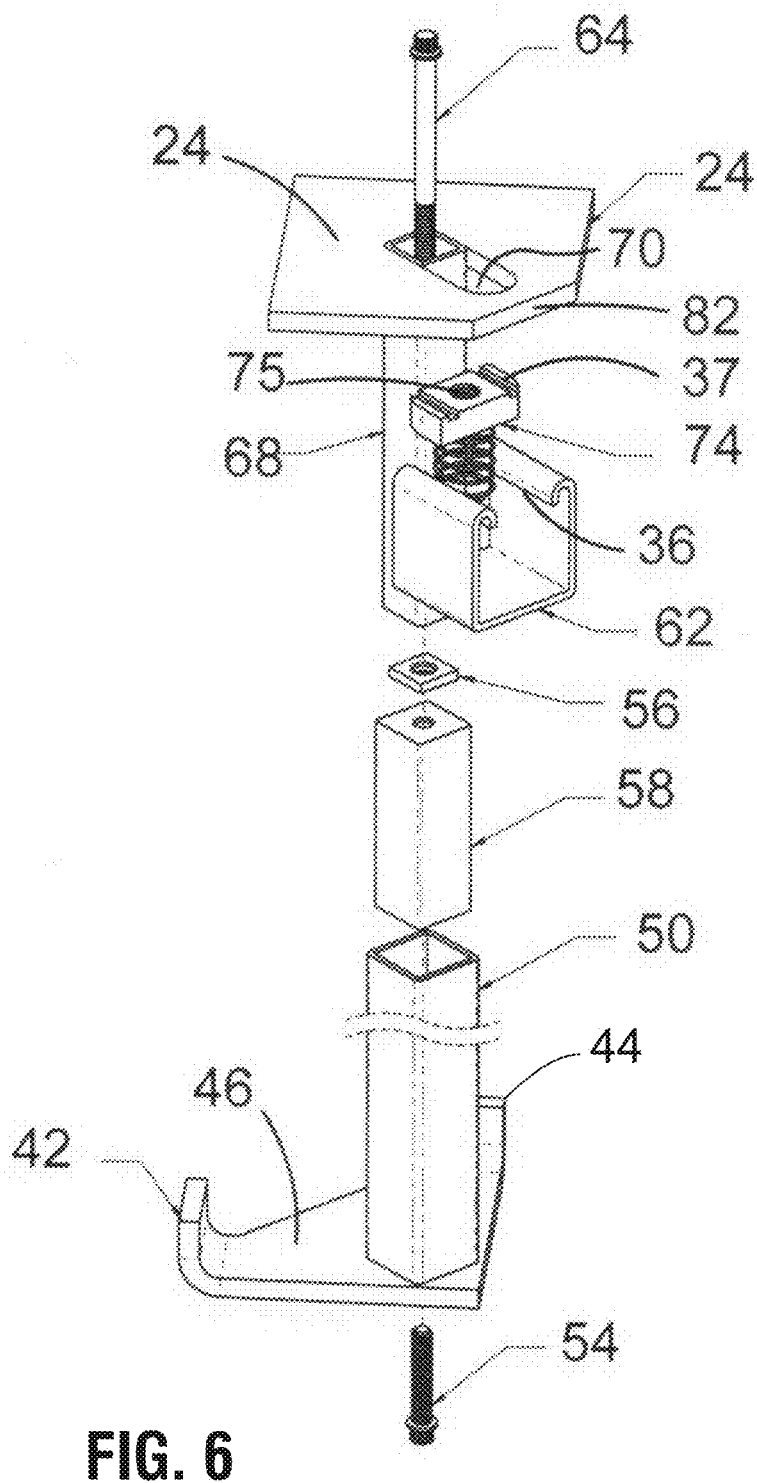
FIG. 6 is an exploded view of a security clamp.

This invention relates to a bolt receiving bolt receiving clamp used with an improved traffic box 10 that has a cover plate 12 and a flange 14 as shown in the exploded view of FIG. 6 and in use in FIG. 1 and FIG. 2. The clamp is called a "bolt receiving clamp" because it provides a means of "receiving a safety bolt" that will hold the cover plate 12 on the traffic box 10 without the presence of molded-in-anchor nuts found in conventional older style traffic boxes such as shown in FIG. 18.

The invention clamp receives a safety bolt 18 that holds the cover plate 12 on, so the clamp is a "bolt receiving clamp".

Figure 3:
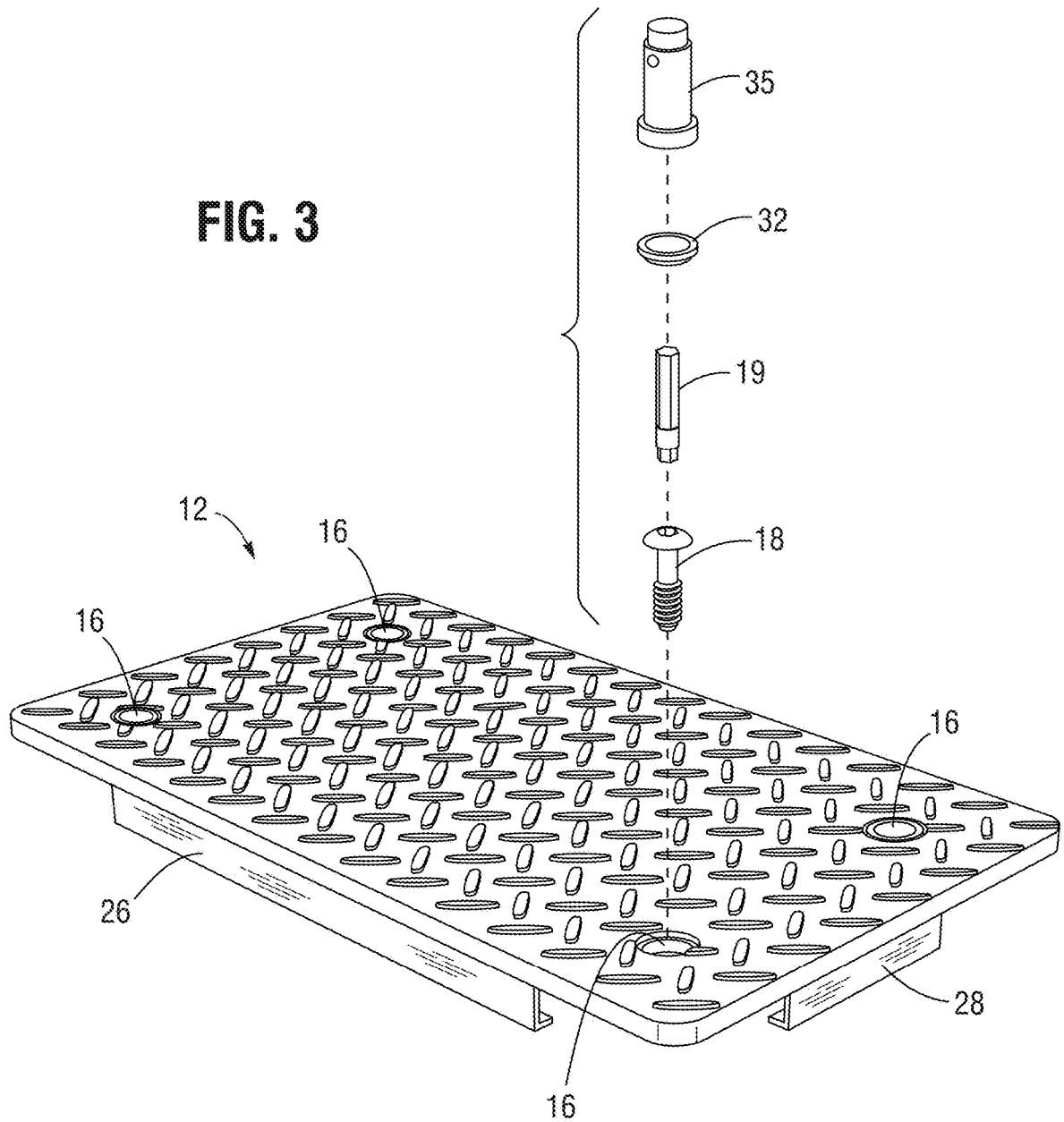

The cover plate used with the traffic box is shown in FIG. 1 and FIG. 3. The cover plate 12 would typically have four or more safety bolt holes 16 through which conventional hex safety bolts 18 would pass to engage with and screw into receiving hex nuts embedded into the corners of the traffic box. The traffic box 10 is also made with a mixture of concrete or concrete and fiber glass as the older style of FIG. 18.

FIG. 1 is a perspective view of the invention traffic box 10 that is shown with cover plate 12 is shown positioned for mounting on the traffic box. A safety bolt 18 is hanging from the lower corner of the cover plate 12. The cover plate 12 is positioned for installation. A safety bolt has its bolt shaft inserted through the cover plate 12.

FIG. 2 is a schematic partial sectional and perspective of the traffic box of FIG. 1 that shows a first bolt receiving clamp 20, a second bolt receiving clamp 22 and top plate 24. The second clamp 22 is shown at a distal corner of the traffic box 10, the second bolt receiving clamp being positioned transverse from the first corner and first clamp.

The embedded nuts shown in FIG. 18 are not present. The traffic box 10 has a flange 14 like the flange shown in FIG. 18. In both cases, the flange 14 extend inward into the traffic box 10 providing a planar ribbon surface that forms a cup 23 to support the cover plate 12.

FIG. 2, shows that each bolt receiving clamp 20, 22 has a claw with a gripping surface under the bottom edge of the corner of the traffic box 10. Each bolt receiving clamp 20, 22 is also shown with a top plate 24 that is gripping the flat planar ribbon surface, or flange 14 that forms a cup 23 that will support the cover plate 12. There is no embedded nut as shown in the embodiment of FIG. 18.

FIG. 3 shows that the cover plate 12 has four bolt holes 16. In practice, only two bolt receiving clamps 20, 22 are used to secure the cover plate. The use of two extra bolt holes 16 provides the option of using an alternate placement of 20, 22 in the event a traffic box 10 is damaged.

An open bolt hole 16 location is schematically shown under a safety bolt 18 ready to enter the safety bolt 18 location.

The safety bolt 18 has a rounded head that has a proprietary receptacle, such as a female spline. A proprietary safety bolt removal bit 19 appears above the safety bolt 18. The safety bolt removal tool bit 19 has a matching spline. The safety bolt has a smooth surface except for a receiving aperture that is complementary to the spline. A proprietary safety bolt cap 32 appears above the removal tool. The next item shown is a proprietary safety bolt cap 32 with a concave surface. The safety bolt cap is a security device that has no visible way of removing it, once it is installed. The safety bolt cap 32 is made with a concave head and cannot be rotated without the use of a tool that has a matching or congruent convex surface, such as the cap removal tool 35.

As shown in the FIG. 3 perspective, the cover plate 12 is made of zinc coated galvanized corrugated steel plate known as a "non-slip Treadplate", a diamond pattern. The plate is typically made of one a zinc coated half inch-thick galvanized steel plate, exclusive of the "non-skid Treadplate" surface.

"A tread plate is also referred to as checker plate or diamond plate. It is a variety of metal stock characterized by a consistent pattern of raised lines on one side. Its textured surface offers slip resistance, which is perfect for use in industrial environments such as stairs, catwalks, and ramps. Tread plates are frequently found in truck beds, trailer floors, and even serve as decorative elements. While aluminum alloys like 6061 are common for tread plates, there are also steel and stainless-steel variants available. A metal surface featuring a raised diamond pattern is typically a tread plate."

The terms Treadplate, Armor Guard, Lockable Traffic Box, or Armor Guard Lockable Traffic Box are believed to be generic terms used to denote a mechanisms or materials that are commonly used in commerce that are. not protected with a registration mark ® or a trademark ™."

Figure 4:
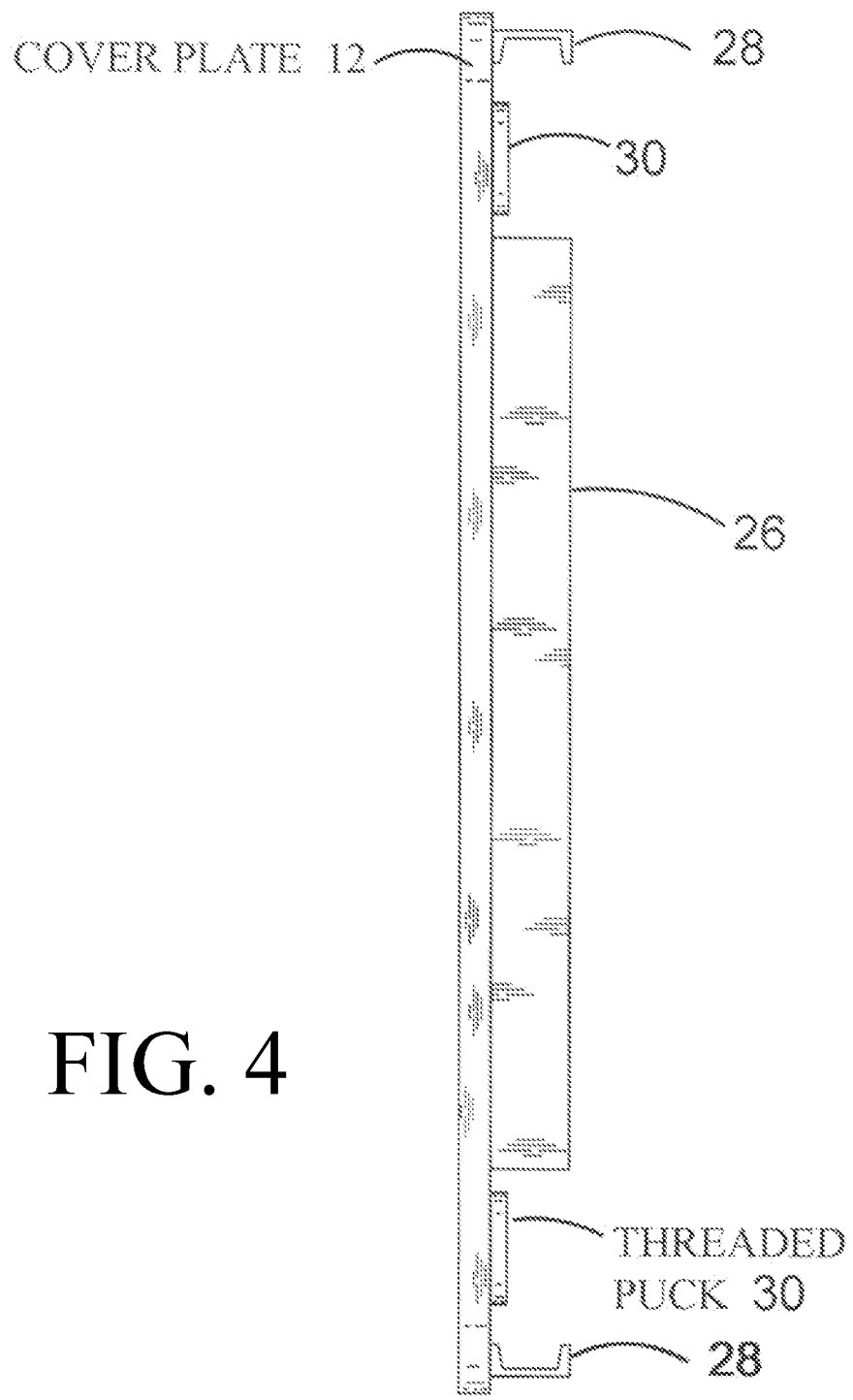
FIG. 4 is a side view of the cover plate of FIG. 3.
Figure 5:
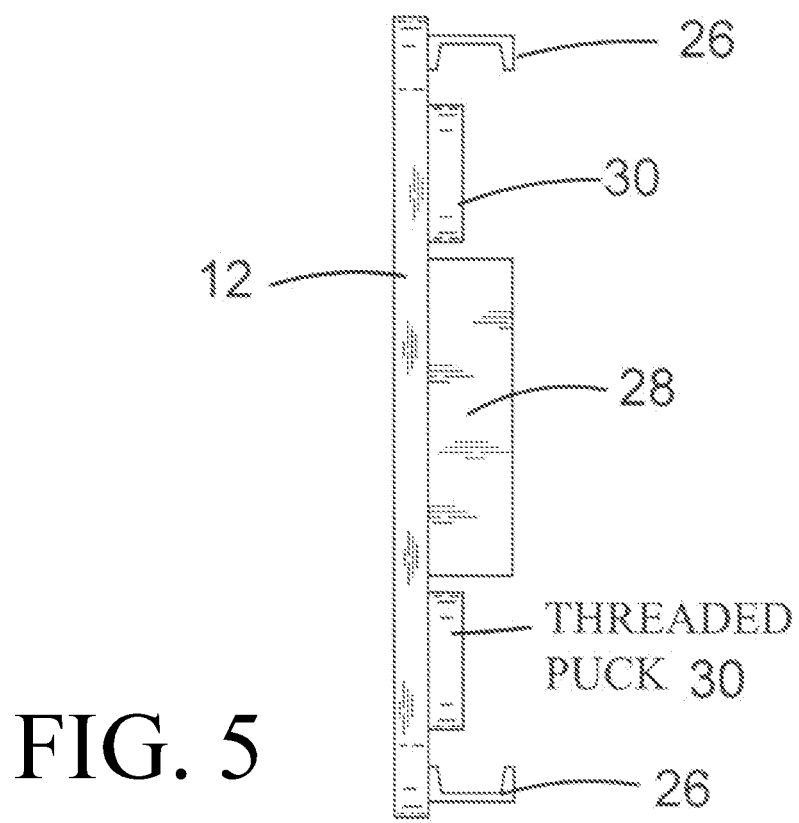
FIG. 5 is an end view of the cover plate of FIG. 3.

FIG. 4 and FIG. 5 show the cover plate in a side view and end view. The side view and end view show rail guides that serve to locate and register the cover plate as it is positioned on the flange 14 or ribbon surface forming an inner rim or cup 23 with a surface on the inside walls of the traffic box 10.

The side rail guides 26 and end rail guides 28 are welded to the underside of the cover plate 12. The rail guides also stiffen the cover plate and aid in keeping the cover plate from being dislodged if the sides of the utility box are subject to impact.

FIG. 4 and FIG. 5 each show two partial side views of a threaded puck 30 present in the cover plate 12, but the details of the threaded puck are more clearly shown in the sectional drawings of FIG. 8 and FIG. 9. These figures show that the threaded puck 30 has a narrow cylindrical top portion that is pressed upward into an aperture in the cover plate 12 from the bottom of the cover plate. A larger diameter, lower portion of each threaded puck 30 hangs below the cover plate 12. As shown in FIG. 8 and FIG. 9, the lower portion of the threaded puck is welded into position at the underside of the cover plate 12. The wider cylindrical diameter portion of the threaded puck is visible in FIG. 4 and FIG. 5.

The threaded puck 30, is formed as a part with a concentric center by first drilling a center hole through the part to provide a drill hole with a diameter large enough to pass the threaded shaft of a safety bolt 18 as shown in FIG. 8 and FIG. 9 without interference and to have a flat bottom to seat the shoulder of the safety bolt 18. The threaded puck is shaped to have an external top portion that has a narrower external diameter than its bottom portion diameter. The narrower diameter portion is then pressed into an aperture in the cover plate and welded to the cover plate 12.

FIG. 6 shows an exploded view of the bolt receiving clamp 20 or 22 with a first claw 42 and a second claw 44. The sheet metal details of forming the first claw and the second claw are shown in FIG. 16*a*, FIG. 16*b*, FIG. 16*c* and FIG. 16*d*.

The first claw 42 and second claw 44 appear in FIG. 6 as integral with the claw plate 46 forming the base of the bolt receiving clamp 20 or 22. The first claw 42 extends in a direction 90 degrees from the second claw. When assembled, the first claw and the second claw each reach under the edges of the traffic box 10 as shown in FIG. 2.

FIG. 16*a*. FIG. 16*b*, FIG. 16*c* and FIG. 16*d* provide a flat pattern for making a first and a second claws 42, 44 as they extend from the claw plate 46 which is integral to the claws. FIG. 16*b* is an edge view of the claw plate 46. FIG. 16*c* is a top view of the claw plate after the extensions have been formed into claws. FIG. 16*d* is a side view of FIG. 16*c*. FIG. 6 shows the bottom tube 50 is orthogonal to the surface of the claw plate 46 and is edge welded to the claw plate 46.

Referring to FIG. 6, a central axis is shown passing through the top tube 68, the standoff 58, the standoff plug 56, the bottom tube 50. where the bottom bolt 54, shown in FIG. 6, through a claw plate bottom hole 55 (not shown in FIG. 6). The central axis passes downward through the bottom bolt hole 55 in the claw plate shown in FIG. 16*a* and FIG. 16*c*.

After passing through the claw plate 46, bottom bolt 54 passes upward through the bolt hole 55 in the claw plate 46 (shown in FIG. 16*a* and FIG. 15*b*) to thread into the bottom end of standoff 58. Two smaller holes that straddle the bolt hole 55 in FIG. 16*a* are drain holes.

FIG. 10*a* shows the central axis 52 passing through the bottom tube 50 and FIG. 11 shows a sectional view of the standoff 58. FIGS. 12*a* and 12*b* are top and side views of the standoff 58 in detail. The standoff 58 is threaded on its top and bottom end.

The threading of the hole through standoff 58 can pass through the length of the standoff 58. The standoff 58 is an insert placed into the bottom tube after the bottom tube is welded to the claw plat 46.

The standoff 58 is secured within the bottom tube by the bottom bolt 54 as the bottom bolt passes through the bottom claw plate into the bottom tube and is threaded into the bottom end of standoff 58. Standoff 58 is clamped to the claw plate 46 secured within the bottom tube 50 by bottom bolt 54. The standoff 58 can reside at first predetermined distance from the claw plate 46 where it can serve as an added means for adjustment for the top plate 24 height above the first and second claws. The bottom bolt 54 part that is used to enter the hole in the bottom of the claw plate and reach the bottom of the standoff 58 selection is a matter of design choice, but may be a 12 point security bolt 64 to reduce parts count or a conventional bolt of proper diameter, length and strength.

FIG. 6 shows the central axis 52 passing from the bottom tube 50 to a top assembly that begins with passing through the standoff plug 56. FIG. 11 shows that the standoff plug 56 is welded into the bottom of the top tube 66. Standoff plug 56 is shown in greater detail in FIG. 14*a* and FIG. 14*b*. FIG. 11 shows the standoff plug 56 inserted into the bottom end of the top tube and welded flush to close the bottom end of the top tube.

As shown in FIG. 10*b* and FIG. 11, the top plate 24 has a channel 70 with a rectangular slot for receiving the top end of the top tube 66. FIG. 10*b* and FIG. 11 show the top end of the top tube 66, inserted into a rectangular end of the channel 70 of a top plate channel 70 and welded into the top plate channel 70.

Figure 7:
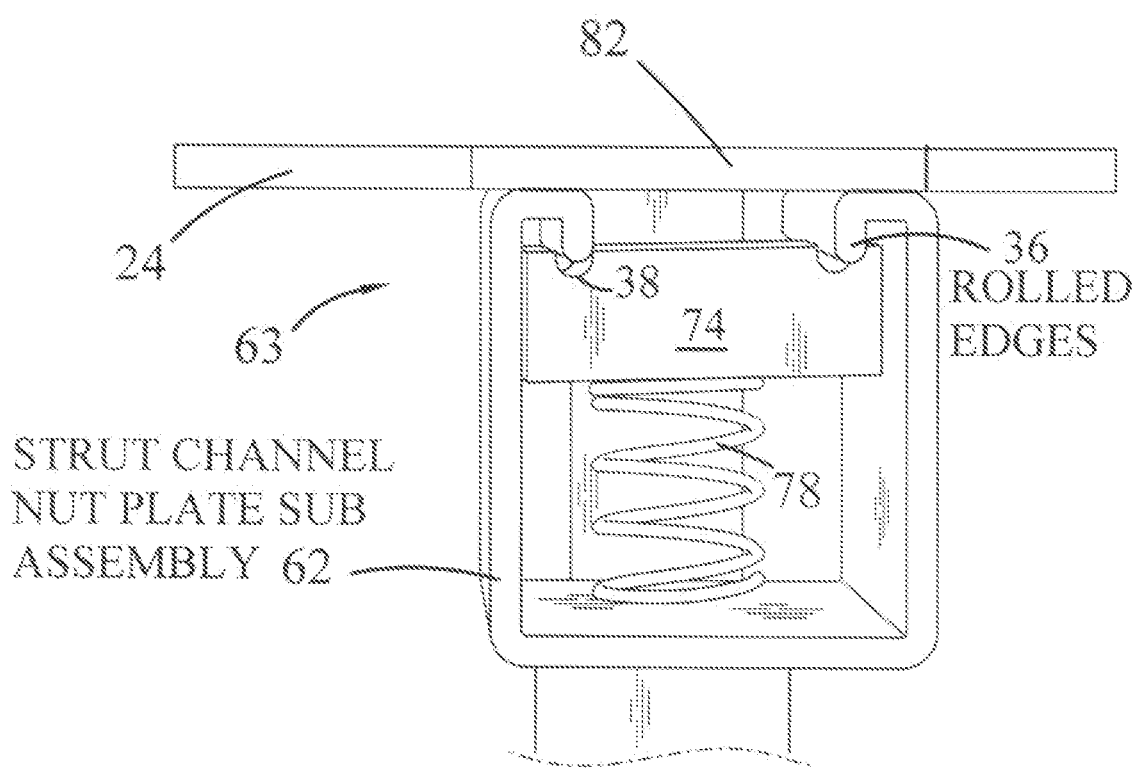
FIG. 7 is a side view of the strut channel nut plate sub-assembly.

FIG. 7 is a schematic front view of the strut channel nut plate sub-assembly 62 that is welded to the bottom of the top plate 24 which is welded to the top tube 66.

FIG. 8 shows that the bottom of the top plate 24, the threaded puck 30 and a safety bolt 18 that is loosely entering the strut channel safety nut 74. The safety bolt is shown in a loose state. FIG. 8 and FIG. 9 show the bottom of the top plate 24, the threaded puck 30 and a safety bolt 18 have tightened the strut channel safety nut 74. The safety bolt 18 is shown in a tightened state. The safety bolt cap 32 is shown covering the safety bolt and screwed into the cover plate 12.

FIG. 8 and FIG. 9 are both sectional views that show a weld bead that attaches the top of the rolled rails on the strut channel nut plate sub-assembly 62 to the bottom of the top plate 24.

FIGS. 14*a* and 14*b* show the standoff plug 56 as a separate part before being welded into the bottom of the top tube 66.

FIG. 7, FIG. 8, FIG. 9 and FIG. 11 show the bottom of the top plate being welded to the top of the rolled rails on the strut channel nut plate sub-assembly 62. FIG. 10*b* and FIG. 11 show the top end of the top tube, inserted into a rectangular end of a top plate channel 70 and welded into the top plate channel 70. The sequence of the welding steps involving the top plate, the top tube 66, the standoff plug 56 is welded in the bottom of the top tube and the rails on the strut channel nut plate sub sub-assembly 62, combine to form a welded integral part or a welded assembly 63.

Assembly of the clamp 20, 22 begins with insertion of the top tube assembly's top tube bottom end into the bottom tube's 50 assembly's tube's top end followed by insertion of a 12 sided or 12 point security bolt 64 into the open end of the top tube on the surface of the top plate 24. The open end of the top tube is shown as the top rectangle in FIG. 10*b*. After the bottom end of the top tube 24 is inserted into the open end of the bottom tube 50, a 12 point security bolt 64 is guided to fall to the bottom of the top tube and through the hole 52 in the standoff plug 56. After passing through the standoff plug 56, the 12 point bolt falls further to engage and thread into the top end of the standoff 58 in the bottom tube 50.

With the welded assembly engaged and coupled to the standoff 58, and with the first claw 42, or second claw 44 positioned under the corner edge of the traffic box 10 and the bottom surface of the top plate 24 positioned on the surface of the cup 23, the 12 point security bolt is adjusted to remove all slack between the claws at the corner bottom edges of the traffic box 10 and the bottom of the top plate 24 on the surface of the cup 23 like flange 14 at the top of the traffic box 10 using the top 12 point security bolt 64 4wrench supplied by the manufacturer. The function of adjusting the 12 point security bolt to remove all of the sack between the claws 42, 44 at the corner bottom edges of the traffic box operates to pull the bottom tube 50 further into the top tube 68 which causes the top plate 24, which is welded to the top plate 24, with its bottom surface edges pressing down onto the traffic box inner flange 14 as the claw plate 46 is raised by the bottom tube 50, is a combined action, that shows with the assistance of drawings FIG. 1 and FIG. 6 one means for reducing the distance between the top plate 24 and the claw plate 46.

FIG. 10*a* shows the strut channel nut plate sub-assembly 62 in a front view. A strut channel safety nut 74 is shown in a side view with two empty spaces on the sides of the spring 78.

FIG. 10*b* shows the top of the top plate 24 with a strut channel safety nut 74 in a top view through the top plate channel 70. The safety bolt entrance threads are shown as a dual ring in the rectangle immediately above the semicircle in the top plate channel 70.

In FIG. 10*b*, the strut channel safety nut 74 is under the top plate 24 and pressed against a wall of the top tube 66 shown in edge view. The ringed circle in the center of the bottom rectangle is the threaded bolt hole that the safety bolt enters to begin to engage the threads.

The top plate channel 70 is positioned to receive the top telescoping tube top end at its rectangular end and to provide a clear path for a safety bolt passing through the cover plate safety bolt hole 16 through the top plate channel 70 to reach and thread into the strut plate sub assembly 40.

A corner of the top plate 24 is removed to provide a top plate reference edge 82. The reference edge 82 is formed to be orthogonal to the rectangular of the channel 70 aperture and parallel to the surface of the top telescoping tube reference surface 84 when installed at the rectangular root of the channel 70.

FIG. 13a shows the top plate 24 in a plan view. FIG. 13b shows the top plate 24 in an edge view and FIG. 13c shows the top plate 24 with the top plate 24 channel in a perspective grayscale view. The top plate channel 70 is shown.

FIG. 15a is a top view of a safety bolt cap 32 showing a convex surface. FIG. 15b is a side view of a safety bolt cap 32 showing threads. FIG. 15c is a bottom view of a safety bolt cap showing the threads and rim.

FIG. 17a, FIG. 17b and FIG. 17c show a safety bolt cap removal tool 35 that appears in FIG. 3 at the top of the sequence of tools in that view. The face of the tool has a convex surface that is formed to match the surface of the safety bolt cap 32. The cap removal tool drives the safety bolt cap 32, used to cover and seal the surface of the safety bolts 18 into cover plate 12, as shown in FIG. 9.

Security and the Safety Bolt

As shown in view of FIG. 7, FIG. 8, FIG. 9 and FIG. 10a, the strut channel nut plate sub-assembly 62 provides rolled edges 36 that ride in the strut channel nut grooves 38 and guide the strut channel nut 74 for capture and threading onto the end of a rotating security bolt 18. The strut channel spring 78 is attached to the strut channel nut and holds the strut channel nut 74 parallel guide grooves against first and second rolled rail edges 36.

As shown in FIG. 7, FIG. 8, FIG. 9, and FIG. 10 the strut channel nut 74 is under the rolled rail edges 36. In operation, the strut channel nut 74 is inside the strut channel with freedom to move while guided and restrained by the rolled rail edges 36. The rolled rail edges 36 capture and guide the parallel grooves 37 formed in the strut channel nut 74. The captured arrangement allows the strut channel nut 74 to relocate over a limited range guided by the rolled rail edges 36 and forced against the end of the security bolt by the compressed spring connected to the strut channel safety nut 74. In operation, the strut channel safety nut 74 moves with the safety bolt 18 in the top plate channel 70 to position the threaded bolt hole 71 to be in contact with the threads in the safety bolt 18. The threaded bolt hole 75 is forced to engage with the threads of the safety bolt 18 as the bolt is rotated. The end of the safety bolt is forced against the threaded bolt hole 75 in the safety nut 74 by the compressed spring 78 as the safety bolt 18 is rotated.

Referring to FIG. 08 and FIG. 9, the security bolt 18 is shown passing through the cover plate 12, first before tightening and then after tightening. The bolt hole 16 schematically extends down to the threaded puck 30 where the bolt hole extends through the threaded puck through which the bolt hole continues to be slightly larger than the diameter of the security bolt 18. The security bolt 18 is shown passing through top plate channel 70 with adequate clearance.

One type of security bolt 18 that is used to secure the cover plate 12 is a component that is ordered from a specialty security bolt company such as one that was found in the United Kingdom. The security bolts are ordered to specification and will be sold only to Governmental customers, agencies of Governments and to corporations with the approval of Municipalities. The strut channel nut with spring 78 is typically a spring nut, ½×13 thread such as one from a hardware store such as the McMaster Carr company: whose part number is 3259T15.

Installing a Cover Plate

With a first and second clamp 20, 22 positioned and tightened on the traffic box 10, the task of installing a cover plate 12 on the cup or flange 14 beneath the rim of the traffic box 10 begins with confirming that the traffic box 10 is properly seated. A safety bolt is dropped into a bolt hole 16 and passes down to the narrow cylindrical top portion of the of the threaded puck 30 and is terminated in a flat shoulder that provides a seat for head of the ½ inch safety bolt typically used to hold the cover plate 12 onto a traffic box 10. After passing through the threaded puck, the security bolt 18 passes through an air gap and then passes through the top plate channel 70 to reach the threaded hole 75 in the strut channel security nut 74.

The security bolt is then shown passing through the security nut into a region surrounded by the compressed spring 78. The strut channel safety nut 74 is shown with its grooves 38 is riding on and forced against the rolled edges 36 in the strut channel plate sub-assembly 62.

The head of the security bolt 18 can be a typical hex head or a proprietary head requiring a special tool for tightening the safety bolt when it is engaged with and threaded into the strut channel safety nut 74, free to slide on the rails in the strut channel nut plate assembly. The strut channel safety nut 74 is free to ride a small distance on the rolled edges 36 of the strut channel rails that are formed by rolling the edges of the frame of the housing when the frame is being formed. The strut channel nut plate sub-assembly 62 is shown in figures FIG. 6, FIG. 7, FIG. 8, FIG. 9, FIG. 10a, and FIG. 11. The strut channel safety nut 74 is captured by the frame of the housing and is not free to rotate. A spring holds the strut channel safety nut 74 against the safety bolt to start the threads into the strut channel safety nut. When the safety bolt is tight, a safety bolt cap as described above is installed.

A Steel Template and its Use

When clamp 20, 22 assemblies are installed in a utility box such as shown in FIG. 1 and FIG. 2, the first claw 42 and second claw 44 each engage and grip a respective lower edge of the open bottom traffic box 10. During the installation of a clamp, the first and second claws 42, 44 and the top plate are guided by hand and positioned in the traffic box with the aid of a steel sheet template. The steel template is a precise stamped sheet template that allows an installer to position two or more bolt receiving clamps 40 in the traffic box 10, so that the safety bolt hole 16 in each cover plate 12 will permit a safety bolt 18 to be centered on the strut channel safety nuts 74 into which the safety bolts 18 must pass.

As used herein, and unless the context dictates otherwise, the term "coupled to" is intended to include both direct coupling (in which two elements that are coupled to each other and contact each other) and indirect coupling (in which at least one additional element is located between the two elements). Therefore, the terms "coupled to" and "coupled with" are used synonymously.

What is claimed is:

1. A bolt receiving clamp for use with a traffic box, having an inner flange comprising: a claw plate formed to have a first and second claw formed to capture a lowest edge of a traffic box, a top plate having a top surface and a bottom surface, the top plate having a first and second edge meeting at a right angle, the centers of the top plate and claw plates being separated by an adjustable tube that positions the top plate and the claw plates to be spaced apart and in parallel plane relation, the centers of the plates being coaxially aligned on an axis that passes through the centers of the plates and is normal to the plates, a nut plate coupled to the top plate for receiving and engaging a safety bolt that has passed through a cover plate, the top plate bottom surface being positioned on the inner flange of the traffic box, the claw plate claws being positioned to grip the lower edges of the traffic box, and a means for reducing the distance between the top plate and the claw plate.

2. The bolt receiving clamp for use with a traffic box of claim 1 wherein: the top plate has a bottom surface that extends onto at least a first edge of the traffic box inner flange at a corner above the claw.

3. The bolt receiving clamp for use with a traffic box of claim 1 wherein the bolt receiving clamp has a telescoping tube having an adjustable length.

4. The bolt receiving clamp for use with a traffic box of claim 3 wherein: the telescoping tube has a top tube and a bottom tube, and wherein the bottom tube is selected to have a cross section that is substantially rectangular and has internal side wall dimensions large enough to receive outside dimensions of the top tube without binding.

5. The bolt receiving clamp for use with a traffic box of claim 4 wherein: the bottom tube has a cylindrical inside wall dimensions sufficient to receive the outside diameter of a cylindrical outer tube free of interference and binding.

6. The bolt receiving clamp for use with a traffic box of claim 5 wherein the telescoping tube is selected to have a cross section that is substantially square.

7. The bolt receiving clamp for use with a traffic box of claim 1 wherein: each of the two claws are separated to grip two respective bottom edges of the traffic box where the edges are reaching for a common corner of the traffic box.

8. The bolt receiving clamp for use with a traffic box of claim 7 wherein: the top plate first and second edges are positioned to reside on a portion of the inner flange at a top corner above the claw plate, and wherein each of the two claws grip a respective bottom edge of the traffic box corner under the top plate first and second edges.

9. A bolt receiving clamp for use with a traffic box having a cover plate with at least two bolt holes, and an inner flange comprising: a traffic box with at least one traffic box corner, an inner flange that forms a receiving cup for receiving and supporting a traffic box cover, at least one bolt receiving clamp having a safety bolt that passes through a cover plate bolt hole, a claw plate formed to provide at least a first and second claw for gripping a respective first and second bottom edge of the traffic box, and a top plate, the top plate having a bottom surface with at a first and second edge, a telescoping tube having an adjustable length, the claw plate and respectively the top plate each being welded to opposing ends of the telescoping tube, the top plate first edge being positioned to rest on a first portion of the receiving cup above the first claw, and the top plate second edge being positioned to rest on a second portion of the receiving cup above the second claw, the length of the tube being adjusted to draw the first and second claw against the first and second bottom edge of the traffic box and the top plate first and second edge against the first and second portion of the receiving flange putting the bolt receiving clamp in tension between the bottom corner first and second bottom edge and the portion of the receiving cup inner flange supporting the top plate first and second edge, a security bolt passes through the cover plate and through the top plate to be received by a strut channel safety nut pressing against the top plate bottom surface.

10. The bolt receiving clamp of claim 9 further comprising: a top telescoping tube with a plug with a center hole is welded into a bottom of the top telescoping tube, a bottom telescoping tube, a standoff, having a threaded top end and a threaded bottom end, the standoff threaded bottom end is inserted into the bottom tube, the bottom of the top tube is telescopically inserted into the top of the bottom tube, a bottom bolt is inserted through a hole in the claw plate and threaded into the standoff bottom end, a multisided security bolt is inserted through a hole in the plug at the bottom end of the upper tube to reach and thread into a threaded hole in the top end of the standoff, as the multisided security bolt is rotated to tighten, the length of the telescoping tube shortens to lock the clamp between the traffic box first and second bottom edge and the traffic box cup.

11. The bolt receiving clamp of claim 9 wherein the top plate has a bottom surface with a first and second edge and a through cut channel, the top of the upper tube is inserted into the through cut channel to be flush with and welded to top plate to be flush with the top surface of the top plate.

12. The bolt receiving clamp of claim 9 wherein the top plate is further characterized to have a top plate channel thru cut that traverses the top plat with a rectangular end at a first end of the channel and a semicircle thru cut at the opposing end of the channel, the top end of the top tube fills the rectangular end of the top plate channel and is welded to the top plate and flush with the surface of the top plate, the plug is inserted into the bottom of the top tube and welded into the bottom of the top tube, the plug has a center hole to receive and pass through the multisided bolt that is then threaded into the top of the insert, a strut channel nut plate sub-assembly is positioned under the top plate and welded to the bottom of the top plate, and contains a strut channel safety nut, the strut channel safety nut is orientated to permit to the safety bolt to pass through the cover plate to engage and thread into the strut channel safety nut.

13. The bolt receiving clamp of claim 10 further comprising: a strut channel nut plate sub-assembly welded to the top plate and orientated to permit the safety bolt to pass through the cover plate to the strut channel nut, the strut channel nut plate sub-assembly comprises a frame formed to have a parallel pair of rolled rails terminating in rolled rail edges, a floating nut has a parallel pair of channels spaced apart to receive ride in and be guided by the rolled rail edges, a compressed spring is coupled to the frame for forcing the floating nut to position and engage the floating nut with an advancing safety bolt while the frame prevents the floating nut from rotating, and the compressed spring urges the floating nut against the advancing safety bolt, the compressed spring urging the floating nut upward to hold the strut channel safety nut against the rolled rail edges, holding the receiving strut channel safety nut in position for engagement with the safety bolt.

14. A bolt receiving clamp for use with a traffic box comprising: a cover plate, a safety bolt passing through a safety bolt hole in the cover plate, a claw plate formed to have a first and second claw for capturing a lowest edge of the traffic box, a top plate having a top and bottom surface, the top plate having an edge, and a channel allowing passage of the safety bolt, a center of the top plate and the claw plate being separated by an adjustable tube that positions the top plate and the claw plate in spaced apart parallel plane relation with the centers of the plates being coaxially aligned on an axis that passes through the centers of the plates and is normal to the plates, a strut channel nut plate sub-assembly is welded to the top plate, the safety bolt passing through the channel to pass into a strut channel nut plate sub-assembly, the strut channel nut plate sub-assembly contains a strut channel safety nut that is spring loaded against the safety bolt, and means for reducing the distance between the top plate and the claw plate.

15. The bolt receiving clamp for use with a traffic box of claim 14 further comprising: the strut channel nut plate sub-assembly is formed to have parallel rolled edges that form parallel rails under the top plate, the strut channel safety nut has parallel channels that match and are held on the edges of the rolled rails that guide the strut channel safety nut to engage the safety bolt.

16. The bolt receiving clamp for use with the traffic box of claim 15 wherein the strut channel nut is orientated to permit the safety bolt to pass through the cover plate and through the top plate to engage and thread into the strut channel nut, the strut channel nut has channels that match and are held on the edges of the rolled rails that guide the strut channel safety nut to engage the safety bolt.

\* \* \* \* \*